United States Patent [19]

Falk

[11] Patent Number: 4,459,806
[45] Date of Patent: Jul. 17, 1984

[54] GOVERNING FUEL INJECTION AND HYDRAULIC TRANSMISSION SIMULTANEOUSLY

[75] Inventor: Lars I. Falk, Söderhamn, Sweden

[73] Assignee: Kockums Industri AB, Sweden

[21] Appl. No.: 184,165

[22] Filed: Sep. 4, 1980

Related U.S. Application Data

[63] Continuation of Ser. No. 18,276, filed as PCT SE78/00015, Jul. 7, 1978, publish as WO79/00036, Feb. 8, 1979, § 102(e) Mar. 7, 1979, abandoned.

[30] Foreign Application Priority Data

Jul. 8, 1977 [SE] Sweden ............................. 7707987

[51] Int. Cl.$^3$ ............................................. F16H 39/46
[52] U.S. Cl. ............................... 60/327; 60/431; 60/449; 60/452; 60/451; 74/857; 74/859; 74/872; 123/352; 180/176
[58] Field of Search ................. 60/327, 390, 423, 431, 60/490, DIG. 2, 395, 449, 452, 433, 434, 451; 74/857, 859, 861, 872; 123/352; 180/176, 179

[56] References Cited

U.S. PATENT DOCUMENTS

| | | | |
|---|---|---|---|
| 3,200,666 | 8/1965 | Schrodt et al. | 74/472 |
| 3,256,747 | 6/1966 | Kempson | 74/472 |
| 3,283,606 | 11/1966 | Brveder | 74/472 |
| 3,579,978 | 5/1971 | Stams | 60/433 |
| 3,579,979 | 5/1971 | Bosch et al. | 60/431 |
| 3,763,220 | 10/1973 | Aono et al. | 74/857 |
| 3,890,360 | 6/1975 | Pruvot et al. | 60/449 X |
| 3,927,528 | 12/1975 | Van der Kolk | 60/431 |
| 4,021,712 | 5/1977 | Ishihara et al. | 74/859 |
| 4,082,013 | 4/1978 | Dornfeld et al. | 74/859 |
| 4,133,406 | 1/1979 | Allerdist | 123/352 |

FOREIGN PATENT DOCUMENTS 1751471 5/1971 Fed. Rep. of Germany.
2411432 9/1975 Fed. Rep. of Germany.

Primary Examiner—George L. Walton
Attorney, Agent, or Firm—Finnegan, Henderson, Farabow, Garrett & Dunner

[57] ABSTRACT

A method of controlling an internal combustion engine (14) having a power control (15) and a variable hydrostatic transmission (16, 17) including a hydraulic pump (16) driven by the internal combustion engine, and a hydraulic engine (17) connected therewith.

By automatic adjustment of the power control (15) and the ratio (E) of the hydrostatic transmission (16, 17) independently of each other according to a predetermined mathematical control function (FIG. 1) which describes a desired relationship between power and rotational speed of the internal combustion engine, a specific discrete power output is delivered between zero load and full load only at an associated discrete rotational speed of the internal combustion engine.

4 Claims, 3 Drawing Figures

GOVERNING FUEL INJECTION AND HYDRAULIC TRANSMISSION SIMULTANEOUSLY

This is a continuation of application Ser. No. 18,276 filed as PCT SE78/00015 Jul. 7, 1978, published as WO79/00036, Feb. 8, 1979, § 102(e) Mar. 7, 1979 now abandoned.

BACKGROUND OF THE INVENTION

The invention relates to a method of controlling an internal combustion engine which is connected to a variable hydrostatic transmission.

For each output load (full load or partial load) of an internal combustion engine there is a specific rotational speed which optimizes a specific operational condition, such as fuel consumption, noise level, wear, emission, resonance phenomena etc. In this connection, optimizing relates to the most favourable value (low or high) of the operational condition in question. Thus, for example, by a specific rotational speed, minimum fuel consumption of the internal combustion engine is obtained and this is utilized when choosing the screw for motor boats. The optimization of one of said conditions may coincide with the optimization of another conditions in a certain case but not in others. Thus, for each application one has to evaluate what is considered most important in the specific case, and to adjust the rotational speed of the engine accordingly.

The invention has been conceived for controlling internal combustion engines having a variable hydrostatic transmission and is based on the fact that the hydraulic pressure in a hydrostatic transmission is directly dependent on the output moment and therefore can be utilized in a simple manner for controlling an internal combustion engine having such a transmission.

SUMMARY OF THE INVENTION

In accordance herewith, the invention relates to a method of controlling an internal combustion engine having a power control and a variable ratio hydrostatic transmission, comprising a hydraulic pump driven by the internal combustion engine, and at least one hydraulic engine connected therewith, and constitutes an improved method wherein the power control and the ratio of the transmission are adjusted independently of one another to satisfy a predetermined mathematical control function which describes a desired relationship between the power output of the engine and the rotational speed of the engine output shaft, whereby a discrete power output is delivered only at an associated discrete rotational speed of said engine output shaft.

In order to elucidate the invention, this will be described in more detail below, reference being made to the accompanying drawings.

DESCRIPTION OF THE PREFERRED EMBODIMENTS

The mathematical control function according to which the power control of the internal combustion engine is adjusted in dependence of the hydraulic pressure in the hydrostatic transmission basically can have the form $$x = f(y)$$

where
 $x$ = the rotational speed of the internal combustion engine and
 $y$ = desired power output.

Figure 1:
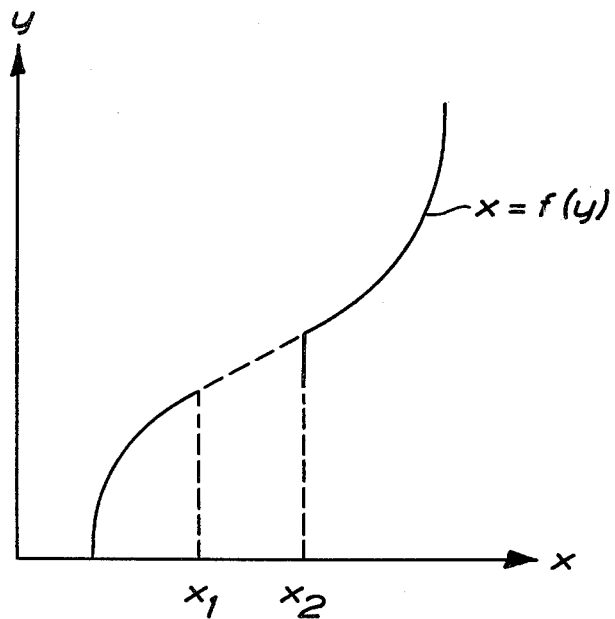
FIG. 1 is a diagram illustrating the mathematical function utilized in the method according to the invention.

Graphically this function can be illustrated according to FIG. 1 wherein the speed $x$ is indicated on the abscissa and the power output $y$ is indicated on the ordinate. The curve can be continuous over the total length thereof, but it can also have a region which one will not use for some reason or other, for example in order to avoid resonant rotational speeds, and this region has been illustrated in FIG. 1 as a dotted portion of the curve between two vertical dotted lines at the rotational speeds $x_1$ and $x_2$. Thus, mathematically $x$ can be a continuous or discontinuous function of $y$.

If the operation condition which it is desired to optimize by applying the method according to the invention is for example the fuel consumption of the internal combustion engine, the function $x = f(y)$ means, from purely practical point of view, that only a very specific rotational speed of the internal combustion engine provides the lowermost (optimum) fuel consumption for each partial power output, i.e. for each power output between zero and full power. There is accordingly an ideal curve in analogy with that shown in FIG. 1 according to which the rotational speed of the internal combustion engine has to be controlled if it is desired to maintain the lowermost fuel consumption possible within the total power range of the internal combustion engine.

As mentioned initially, the hydraulic pressure in a hydrostatic transmission is directly dependent on the output moment. The moment multiplied by the rotational speed or—in case of a vehicle—the velocity makes the power, and by measuring the hydraulic pressure in the hydrostatic transmission and multiplying by a rotational speed or a velocity, a power value is thus obtained. In the same manner as it is possible to obtain an actual value of the power output by measuring an actual value of the rotational speed, it is possible to obtain a nominal value of the power output by producing a nominal value of the rotational speed, which is dependent on predetermined conditions. Hence, when the nominal value of the power thus provides a rotational speed of the internal combustion engine, which is ideal according to the control function that has been chosen, there is simultaneously a demand for a specific ratio in the hydrostatic transmission between the internal combustion engine and the shaft where the output moment is measured, and this ratio can be calculated by dividing the rotational speed of the internal combustion engine by the rotational speed of said shaft.

Figure 2:
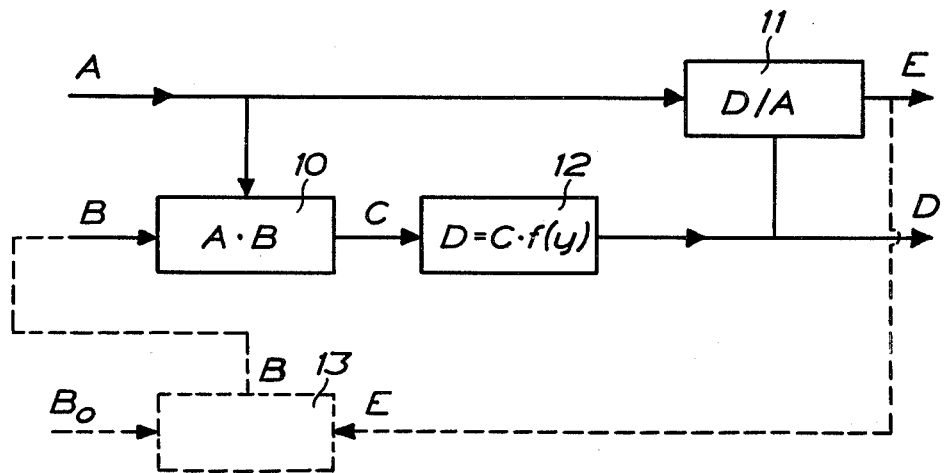
FIG. 2 is a block diagram illustrating the principle of the method according to the invention, a modification or addition in case the hydraulic pump as well as the hydraulic motor is adjustable, being indicated by dotted lines.

The calculating operations related above lead to the block diagram shown by solid lines in FIG. 2, for performing the method according to the invention the assumption being made that the hydrostatic transmission comprises a variable displacement hydraulic pump, for example an axial piston pump having an adjustable wobble plate, and one or more hydraulic engines of the fixed displacement type.

In FIG. 2, A indicates a signal representing the desired rotational speed of the shaft or shafts where the moment (drive power) is delivered, and this signal is supplied to a function unit 10 as well as a function unit 11. In addition to the signal A, also a signal B is supplied to the function unit 10, said signal B representing the hydraulic pressure in the hydrostatic transmission which as mentioned above is directly proportional to the output moment of the transmission. In the function unit 10 the signals A and B are multiplied and the product of these two signals, designated signal C, represents the necessary power for obtaining a desired rotational speed, all in accordance with the statements made above.

The signal C is supplied to a function unit 12 which is programmed according to $D = C \times f(y)$ where D is the rotational speed of the internal combustion engine and f(y) is the control function (FIG. 1) chosen for optimizing the fuel consumption of the internal combustion engine at different loads. The function unit 12 thus produces a signal D which represents the rotational speed of the internal combustion engine, and this signal is supplied to the function unit 11 where it is divided by the signal A representing the output rotational speed, in order to obtain a signal E representing the ratio of the hydrostatic transmission, which is required in order to obtain the power output represented by the signal C, at the rotational speed D of the internal combustion engine.

The signal D thus can be utilized in suitable servo means for adjusting the power control of the internal combustion engine, such as a carburetor throttle or an injection pump, in order to obtain the rotational speed of the internal combustion engine as calculated in the system and represented by the signal D, while the signal E can be utilized for adjusting servo means by which a larger or minor displacement of the hydraulic pump in the hydrostatic transmission is obtained, i.e. a larger or minor increase of the angle of the wobble plate of the hydraulic pump if this is an axial piston pump, in order to obtain the ratio of the hydrostatic transmission which has been calculated in the circuit system and is represented by the signal E.

If also the hydraulic engine or engines in the hydrostatic transmission have a variable displacement, i.e. an adjustable wobble plate in case these engines comprise axial piston engines, it is necessary to measure the output moment as represented by the signal B in FIG. 2 over a pressure transducer which measures the hydraulic pressure in the transmission, to know the actual displacement of the hydraulic engine or engines at each occasion of measuring.

If the signal representing the hydraulic pressure existing in the hydrostatic transmission as measured by a pressure transducer is designated $B_o$, this signal thus must be adapted or modified before it is supplied to the function unit 10, in dependence on the existing ratio of the hydrostatic transmission, said ratio being dependent not only on the adjustment (displacement) of the hydraulic pump but also on the adjustment (displacement) of the hydraulic engine or engines. This adaptation or modification is provided according to the addition of the system, shown by dotted lines in FIG. 2, in a function unit 13 to which is supplied the signal $B_o$ as well as the signal E. The function of unit 13 is calculated such that the signal obtained from the unit 13 comprises the signal B previously mentioned which represents the output moment. Mathematically, said adaptation can be performed in several manners principally depending on the form of the signals $B_o$ and E but the result of the adaptation shall always be that at each occasion independent of the adjusted displacement of the hydraulic engine or engines, the signal B shall represent the output moment.

In practice the function units 10 to 13 can be of mechanical, pneumatic, hydraulic, electro-mechanical, electronic or any other type common in modern control technique.

For controlling an internal combustion engine according to a specific mathematical control function it may not be necessary to provide exactly the set-up shown diagrammatically in FIG. 2. The control function can be made more complicated by taking into consideration a greater number of operating factors as input signals.

Figure 3:
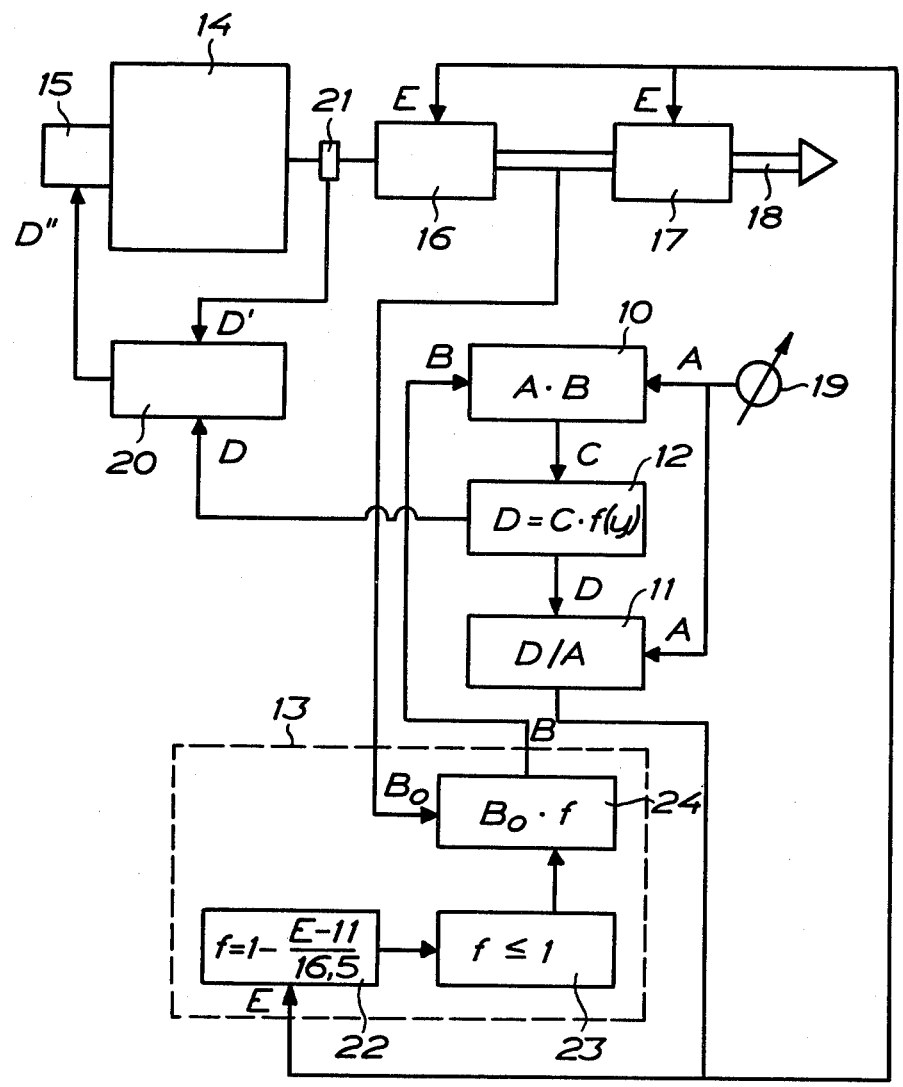
FIG. 3 is a block diagram of a practical application of the method according to the invention.

In FIG. 3 the invention is illustrated as applied to a tractor drive transmission comprising an internal combustion engine 14 having a power control 15, for example a pressure ignition engine having an adjustable injection pump, a hydraulic pump 16 driven by the internal combustion engine and having an adjustable wobble plate, and a hydraulic engine 17 connected to the hydraulic pump and also having an adjustable wobble plate, said hydraulic engine being connected for example to the ground wheels of the tractor as indicated by an arrow 18 symbolizing the power output from the drive transmission shown. More hydraulic engines than one can be provided, for example one for each ground wheel of the tractor.

The control system according to the invention for the drive transmission described, in the present case is assumed to be built up of electronic components, and this system comprises the function units 10, 11 and 12 previously mentioned, as well as the function unit 13 which is shown in more detail in FIG. 3 and will be described more closely. From the hydraulic connection between the hydraulic pump 16 and the hydraulic engine 17 the signal is derived, which is representative of the pressure in the hydrostatic transmission and is designated $B_o$. This signal is supplied to the function unit 13 which in turn, by modification by the signal E, supplies the signal B to the function unit 10. The signal A is obtained from a potentiometer 19 which is manually adjustable and is adjusted by the tractor driver to a value corresponding to the desired driving velocity, i.e. the desired output rotational speed, designated A. The potentiometer 19 thus is the "gas control" of the tractor and can be connected to a pedal, lever or other suitable device. The signal from the potentiometer 19 is supplied to the function unit 10 as well as the function unit 11 in the manner previously indicated. The signal C which represents the power is supplied to the function unit 12, and this unit supplies the signal D representing the nominal value of the rotational speed of the internal combustion engine, to the function unit 11 which in turn supplies the signal E to the function unit 13 for the calculation of the signal B, and to servo-controlled adjustment means for the wobble plate of the hydraulic pump 16 and the hydraulic engine 17, respectively.

The signal D obtained from the function unit 12 is supplied to a comparator 20 to which is also supplied a signal D' representing the actual value of the rotational speed of the internal combustion engine 14. This signal D′ is obtained from a tachometer type transmitter 21 provided on the output shaft of the internal combustion engine. The comparator 20 compares the nominal value D and the actual value D′ of the rotational speed of the internal combustion engine and supplies a control signal D″ to the power control 15 in order to adjust this control to such a position that the actual value D′ of the rotational speed will be equal to the nominal value D.

For adjustment of the power output 18 the hydrostatic transmission can be controlled in dependence on the signal E in such a manner that the ratio is adjusted from a condition wherein the angle of the wobble plate of the hydraulic engine is at maximum (corresponding to maximum displacement) and the angle of the wobble plate of the hydraulic pump is at minimum (corresponding to minimum displacement) by initially increasing the angle of the hydraulic pump progressively to full displacement and then decreasing the angle of the hydraulic engine progressively to minimum displacement. For example, the signal E can be varied between 0 and 22 V where the voltage 0 V means a ratio of $1:\infty$ and the voltage 11 V corresponds to maximum angle of pump and engine, while variation of the voltage E from 11 to 22 means that the displacement of the engine is varied from maximum to minimum. In the example shown herein the maximum displacement of the engine is three times as large as the minimum displacement thereof; expressed in figures, the maximum displacement is accordingly K·3, and the minimum displacement is K·1, where K is a constant.

For the calculation of the signal B in dependence on the signal $B_o$ and the signal E according to the basic embodiment of the control system of the invention which is shown by the addition to the block diagram in FIG. 2, indicated by dotted lines, the signal E is supplied to the function unit 13, said signal varying between 0 and 22 V as mentioned above.

The signal E is supplied to a function unit 22 which calculates the signal f according to the relation $$-\left[\frac{E-11}{16,5}\right] + 1, \text{ i.e. } f = 1 - \frac{E-11}{16,5}.$$

The signal f is supplied over a limiter 23 to a function unit 24 which calculates the signal B as $B_o \cdot f$ in the same manner as previously indicated.

In order to avoid that the internal combustion engine 14 will be overloaded it is suitable to give the signal D priority over the signal E.

I claim:

1. In a method of controlling an internal combustion engine having a power control for controlling the rotational speed of the internal combustion engine, and a variable-ratio hydrostatic transmission having an output shaft for providing the power output of the internal combustion engine, said transmission comprising a hydraulic pump driven by the internal combustion engine and at least one hydraulic engine hydraulically connected to the hydraulic pump, comprising: automatically and constantly adjusting said power control and the value of the ratio of said transmission dependent upon (i) a manually selected desired value of rotational speed of said transmission output shaft and (ii) the measured value of the torque of said transmission output shaft, a first signal being generated for said automatic adjustment of said power control, and a second signal being generated for said automatic adjustment of said ratio of said transmission, the improvement comprising:
generating a third signal which satisfies a predetermined mathematical relationship between said power output provided at said transmission output shaft and the rotational speed of the internal combustion engine, and automatically and constantly controlling said first signal and said second signal dependent upon said third signal.

2. A method according to claim 1, further comprising the step of selecting said mathematical relationship so as to establish a selected operational condition of the internal combustion engine or the hydrostatic transmission.

3. A method according to claim 1 or 2, wherein the hydraulic pump and hydraulic engine are adjustable, further comprising the steps of generating a fourth signal representing the hydraulic pressure in the transmission and modifying said fourth signal dependent upon the measured value of the ratio of the transmission, said fourth signal comprising a portion of the information utilized to effect the automatic adjustment of said power control and said transmission ratio.

4. In an apparatus for controlling an internal combustion engine having a power control for controlling the rotational speed of the internal combustion engine, and a variable-ratio hydrostatic transmission having an output shaft for providing the power output of the internal combustion engine, said transmission comprising a hydraulic pump driven by the internal combustion engine and at least one hydraulic engine hydraulically connected to the hydraulic pump, comprising: means for automatically and constantly adjusting said power control and the value of the ratio of said transmission dependent upon (i) a manually selected desired value of the rotational speed of said transmission output shaft and (ii) the measured value of the torque of said transmission output shaft, including means for generating a first signal for said automatic adjustment of said power control, and means for generating a second signal for said automatic adjustment of said ratio of said transmission, the improvement comprising:
means for generating a third signal which satisfies a predetermined mathematical relationship between said power output provided at said transmission output shaft and the rotational speed of the internal combustion engine, and means for automatically and constantly controlling said first signal and said second signal dependent upon said third signal.

* * * * *